United States Patent
Wills et al.

(10) Patent No.: US 7,075,268 B2
(45) Date of Patent: Jul. 11, 2006

(54) SYSTEM AND METHOD FOR INCREASING OUTPUT HORSEPOWER AND EFFICIENCY IN A MOTOR

(75) Inventors: Frank Eugene Wills, York, PA (US); Harold Robert Schnetzka, York, PA (US)

(73) Assignee: York International Corporation, York, PA (US)

( * ) Notice: Subject to any disclaimer, the term of this patent is extended or adjusted under 35 U.S.C. 154(b) by 133 days.

(21) Appl. No.: 10/789,632

(22) Filed: Feb. 27, 2004

(65) Prior Publication Data

US 2005/0189904 A1   Sep. 1, 2005

(51) Int. Cl.
  *H02P 3/18*   (2006.01)
  *H02P 23/00*  (2006.01)
  *H02P 27/00*  (2006.01)

(52) U.S. Cl. ............... 318/812; 318/800; 318/803; 318/807; 363/36; 363/37; 363/40; 363/45; 363/56; 62/228.1; 62/230; 62/510

(58) Field of Classification Search ......... 318/799–812
See application file for complete search history.

(56) References Cited

U.S. PATENT DOCUMENTS

| | | | |
|---|---|---|---|
| 3,390,320 A | | 6/1968 | Kammiller et al. |
| 3,621,365 A | | 11/1971 | Beck et al. |
| 3,780,324 A | * | 12/1973 | Greenwell ............ 310/180 |
| 3,838,322 A | * | 9/1974 | Greenwell ............ 318/810 |
| 3,909,687 A | | 9/1975 | Abbondanti |
| 3,991,354 A | * | 11/1976 | Rosa et al. ........... 318/800 |
| 4,150,425 A | | 4/1979 | Nagano et al. |
| 4,151,725 A | | 5/1979 | Kountz et al. |
| 4,152,902 A | | 5/1979 | Lush |

(Continued)

FOREIGN PATENT DOCUMENTS

DE    1004 7629    4/2002

(Continued)

OTHER PUBLICATIONS

Murphy, J.M.D., "Thyristor Control of A.C. Motors", Principles of Variable-Frequency A.C. Drives, Oct. 10, 1975, pp. 3-4, 111-114, & 120-121, Pergamon Press, New York.

*Primary Examiner*—Rina Duda
*Assistant Examiner*—Tyrone Smith
(74) *Attorney, Agent, or Firm*—McNees Wallace & Nurick LLC

(57) ABSTRACT

A system and method are provided to increase the horsepower of an induction motor. One technique for increasing the horsepower of a motor is to connect the motor to a variable speed drive that is providing an output voltage and frequency greater than the standard line voltage and frequency. The connection of the variable speed drive to the induction motor enables the motor to be operated in constant flux or constant volts/Hz mode and provide a greater output horsepower. Another technique for increasing the horsepower of a motor is to use a dual voltage motor configured for lower voltage operation and then provide the motor with the corresponding voltage and frequency for higher voltage operation. The higher voltage and higher frequency can be provided by a variable speed drive with or without voltage boost. A variable speed drive without voltage boost, but with frequency boost, can be used in situations where the standard main voltage is greater than the lower voltage rating.

23 Claims, 3 Drawing Sheets

U.S. PATENT DOCUMENTS

| | | | |
|---|---|---|---|
| 4,177,649 A | | 12/1979 | Venema |
| 4,207,510 A | * | 6/1980 | Woodbury .................. 318/802 |
| 4,259,845 A | * | 4/1981 | Norbeck ...................... 62/209 |
| 4,538,100 A | * | 8/1985 | Tuten et al. ................ 318/808 |
| 4,546,423 A | | 10/1985 | Seki |
| 4,656,571 A | | 4/1987 | Umezu et al. |
| 4,758,938 A | * | 7/1988 | Kanazawa ................... 363/41 |
| 4,787,211 A | | 11/1988 | Shaw |
| 4,958,118 A | | 9/1990 | Pottebaum |
| 4,971,522 A | * | 11/1990 | Butlin ......................... 417/18 |
| 4,992,718 A | * | 2/1991 | Kumaki ...................... 318/768 |
| 5,010,287 A | * | 4/1991 | Mukai et al. ............... 318/801 |
| 5,088,297 A | * | 2/1992 | Maruyama et al. ........ 62/228.4 |
| 5,214,367 A | * | 5/1993 | Uesugi ....................... 318/803 |
| 5,218,283 A | * | 6/1993 | Wills et al. ................. 318/748 |
| 5,272,429 A | * | 12/1993 | Lipo et al. .................. 318/808 |
| 5,350,992 A | | 9/1994 | Colter |
| 5,446,645 A | | 8/1995 | Shirahama et al. |
| 5,488,279 A | | 1/1996 | Kawamoto et al. |
| 5,492,273 A | | 2/1996 | Shah |
| 5,503,248 A | | 4/1996 | Peruggi et al. |
| 5,509,504 A | | 4/1996 | McHugh et al. |
| 5,528,114 A | | 6/1996 | Tokizaki et al. |
| 5,612,605 A | * | 3/1997 | Tao ............................ 318/805 |
| 5,845,509 A | | 12/1998 | Shaw et al. |
| 6,008,616 A | | 12/1999 | Nagayama et al. |
| 6,018,957 A | | 2/2000 | Katra et al. |
| 6,031,738 A | | 2/2000 | Lipo et al. |
| 6,124,697 A | | 9/2000 | Wilkerson |
| 6,185,946 B1 | | 2/2001 | Hartman |
| 6,229,722 B1 | | 5/2001 | Ichikawa et al. |
| 6,246,207 B1 | * | 6/2001 | VanSistine et al. ......... 318/801 |
| 6,316,895 B1 | * | 11/2001 | Ramarathnam ............. 318/439 |
| 6,325,142 B1 | | 12/2001 | Bosley et al. |
| 6,370,888 B1 | | 4/2002 | Grabon |
| 6,408,645 B1 | | 6/2002 | Tsuboe et al. |
| 6,434,960 B1 | | 8/2002 | Rousseau |
| 6,459,596 B1 | | 10/2002 | Corzine |
| 6,459,606 B1 | | 10/2002 | Jadric |
| 6,579,067 B1 | * | 6/2003 | Holden ......................... 417/2 |
| 2003/0041605 A1 | | 3/2003 | Butcher et al. |
| 2005/0188708 A1 | * | 9/2005 | Wills et al. ................... 62/175 |

FOREIGN PATENT DOCUMENTS

| | | |
|---|---|---|
| EP | 0 695 024 A2 | 1/1996 |
| EP | 1 022 844 A2 | 7/2000 |
| EP | 1 055 885 A2 | 11/2000 |
| GB | 1579045 | 11/1980 |
| JP | 60102878 | 6/1985 |
| WO | WO 97/18420 | 5/1997 |
| WO | WO 03044939 A | 5/2003 |

* cited by examiner

SYSTEM AND METHOD FOR INCREASING OUTPUT HORSEPOWER AND EFFICIENCY IN A MOTOR

BACKGROUND OF THE INVENTION

The present invention relates generally to increasing the performance of a motor. More specifically, the present invention relates to the increasing of the horsepower and efficiency of an induction motor by applying a motor input voltage and frequency greater than the motor's rated voltage and frequency.

In the past, induction motors, both single phase and multi-phase, were designed to operate from standard line (main) voltages and frequencies that were available from the power distribution system of the facility where the motor was being operated. The use of line voltages and frequencies typically limited the output of a motor to one speed and one horsepower because the motor's output speed is related to the input frequency to the motor and the motor's output power is related to the input voltage to the motor.

Next, variable speed drives (VSDs) were developed that could vary the frequency and/or voltage that was provided to a motor. This capability to vary the input frequency and voltage to a motor resulted in a motor that was capable of providing a variable output speed and power to the load of the motor. Furthermore, for the motor to provide a relatively constant output torque to the load, regardless of the speed of the motor, the motor had to be operated in a constant flux or constant volts/Hz mode. The operation of a motor in a constant flux or constant volts/Hz mode requires that any increase or decrease of the output frequency of the VSD that drives the motor be matched by a corresponding increase or decrease of the output voltage of the VSD, and vice versa. In addition, when a motor is operated in the constant flux or constant volts/Hz mode, the current drawn by the motor will remain relatively constant, especially in situations where the motor is being used with a constant torque load, such as a positive displacement compressor used in air conditioning equipment.

One problem with trying to operate a motor in the constant flux or volts/Hz mode using a variable speed drive is that most variable speed drives are not capable of providing an output voltage to the motor that is any greater than the input AC line voltage provided to the variable speed drive. This limitation on the output voltage of the variable speed drive results in the variable speed drive not being able to provide a constant torque to the load when the speed of the motor is increased (as a result of an increase in the output frequency of the variable speed drive above the line frequency provided to the variable speed drive) because the output voltage of the variable speed drive cannot match the increase in the output frequency.

Furthermore, the selection of a motor for use with a particular load is dependent upon a variety factors including the input voltage to the motor. A motor is usually selected to have a rated voltage that is equal to a standard line voltage or the variable speed drive's rated output voltage, which is equal to its input voltage, if applicable.

Therefore what is needed is a system and technique for operating a motor to obtain a larger output horsepower by using higher input voltages and frequencies without having to use a motor with a higher voltage rating.

SUMMARY OF THE INVENTION

The horsepower of an induction motor can be increased by operating the motor at a voltage and frequency greater than the motor's rated voltage and frequency. One technique for operating the motor at a voltage and frequency greater than the rated voltage and frequency is to connect the motor to a variable speed drive that is providing an output voltage and frequency greater than the standard line voltage and frequency. The connection of the variable speed drive to the induction motor enables the motor to be operated in constant flux or constant volts/Hz mode and provide a greater output horsepower to the corresponding motor load. The operation of the motor at the higher voltage and frequency for a constant torque load, such as a screw compressor, results in the motor current remaining relatively constant as the frequency is increased. The relatively constant current generates relatively constant motor losses at frequencies above the motor's rated frequency, thus horsepower is increased, while motor losses remain constant, thereby providing increased motor efficiency as compared to the motor operating at its rated frequency. Another technique for operating the motor at a voltage and frequency greater than the rated voltage and frequency is to use a dual voltage motor (e.g., a motor rated for both a lower voltage operation, 230 V, and a higher voltage operation, 460 V) configured for the lower voltage operation and then provide the motor a voltage and frequency for the higher voltage operation. The higher voltage and higher frequency can be provided by a variable speed drive with or without voltage boost. A variable speed drive without voltage boost, but with frequency boost, can be used in situations where the standard main voltage is greater than the lower voltage rating of the motor. As discussed above, the use of higher voltage and frequency increases the available horsepower and results in increased motor efficiency when operated in a constant flux or constant volts/Hz mode.

One embodiment of the present invention is directed to a method of increasing the output horsepower of an induction motor. The method includes the steps of providing an induction motor having a predetermined rated operational voltage and frequency and providing a variable speed drive capable of outputting a voltage and frequency greater than the predetermined rated operational voltage and frequency of the motor. The predetermined rated operational voltage and frequency of the motor provides a predetermined output horsepower. The method also includes the steps of connecting the variable speed drive to the induction motor to provide power to the induction motor and operating the variable speed drive to provide an output voltage and frequency to the induction motor greater than the predetermined rated operational voltage and frequency of the induction motor. Wherein powering the induction motor at an output voltage and frequency greater than the predetermined rated operational voltage and frequency results in the motor generating an output horsepower greater than the predetermined output horsepower.

Another embodiment of the present invention is directed to a system for increasing the output horsepower of a motor. The system includes a motor having a predetermined rated operational voltage and frequency and a variable speed drive connected to the motor to power the motor. The motor is configured to generate a predetermined output horsepower in response to the predetermined rated operational voltage and frequency of the motor being input to the motor. The variable speed drive is configured to provide a variable output voltage and variable output frequency to the motor. The variable output voltage and variable output frequency ranging between an output voltage and output frequency less than the predetermined rated operational voltage and frequency and an output voltage and output frequency greater than the predetermined rated operational voltage and frequency. Wherein operation of the motor at an output voltage and output frequency greater than the predetermined rated operational voltage and frequency results in the motor generating an output horsepower greater than the predetermined output horsepower.

A further embodiment of the present invention is directed to a refrigeration system having a compressor, a condenser and an evaporator connected in a closed refrigerant circuit. The refrigeration system further including a motor connected to the compressor to drive the compressor. The motor has a predetermined rated operational voltage and frequency and is configured to generate a predetermined output horsepower in response to the predetermined rated operational voltage and frequency of the motor being input to the motor. The refrigeration system also includes a variable speed drive connected to the motor to power the motor. The variable speed drive is configured to provide a variable output voltage and variable output frequency to the motor. The variable output voltage and variable output frequency ranges between an output voltage and output frequency less than the predetermined rated operational voltage and frequency and an output voltage and output frequency greater than the predetermined rated operational voltage and frequency. Wherein operation of the motor at an output voltage and output frequency greater than the predetermined rated operational voltage and frequency results in the motor generating an output horsepower greater than the predetermined output horsepower.

One advantage of the present invention is that greater output horsepower can be obtained from an induction motor.

Another advantage of the present invention is that the operating efficiency of an induction motor can be increased when operated at the higher operating frequencies.

Still another advantage of the present invention is that an induction motor can be operated in a broader range of voltages and frequencies.

A further advantage of the present invention is that the induction motor used for driving a particular load can have a reduced size, a reduced weight and/or a reduced cost.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
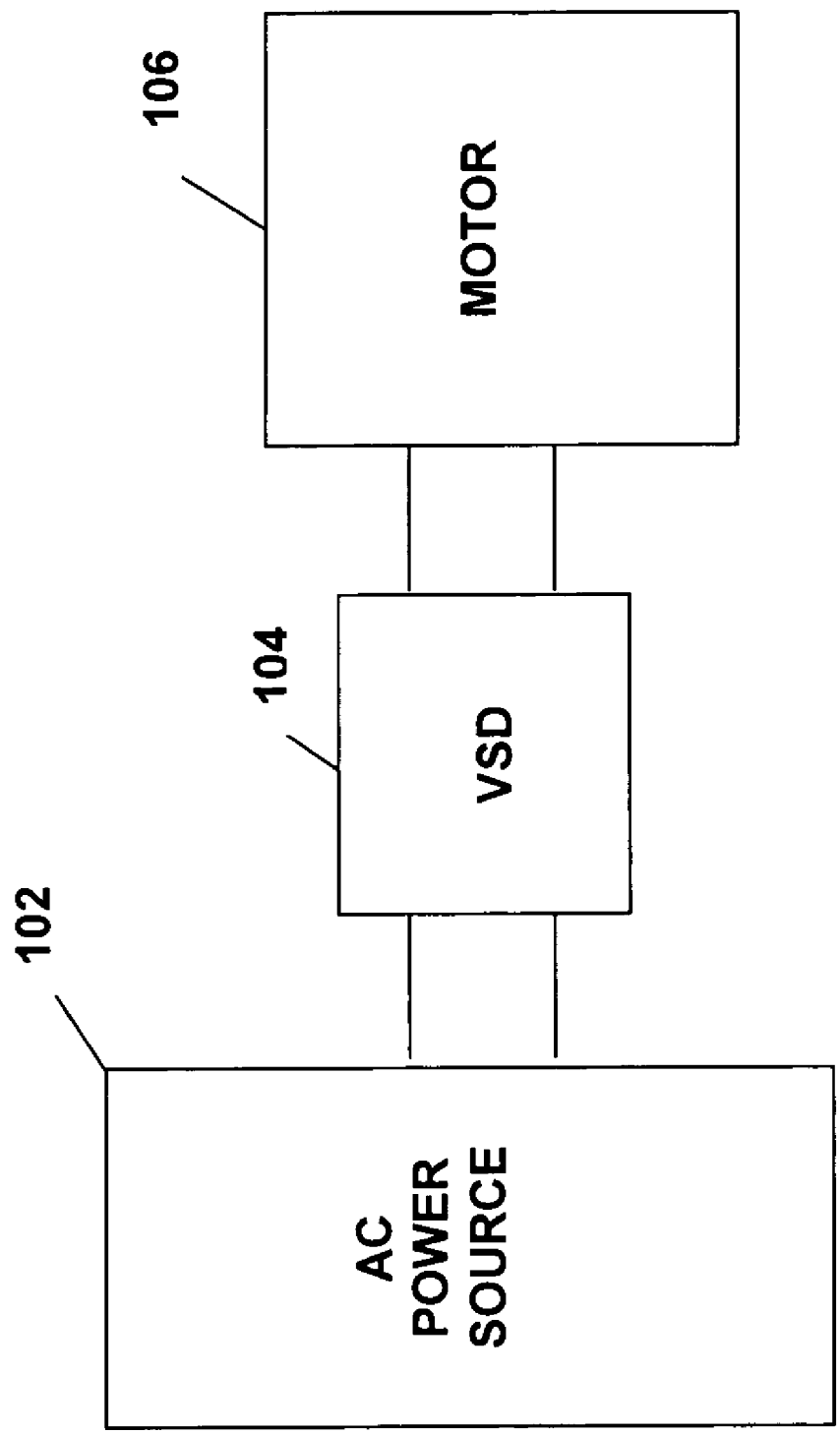
FIG. 1 illustrates schematically a general system configuration of the present invention.

FIG. 1 illustrates generally the system configuration of the present invention. An AC power source 102 supplies AC power to a variable speed drive (VSD) 104, which in turn, supplies AC power to a motor 106. The AC power source 102 provides single phase or multi-phase (e.g., three phase), fixed voltage, and fixed frequency AC power to the VSD 104 from an AC power grid or distribution system that is present at a site. The AC power grid can be supplied directly from an electric utility or can be supplied from one or more transforming substations between the electric utility and the AC power grid. The AC power source 102 can preferably supply a three phase AC voltage or line voltage of 200 V, 230 V, 380 V, 460 V, or 600 V, at a line frequency of 50 Hz or 60 Hz to the VSD 104 depending on the corresponding AC power grid. It is to be understood that the AC power source 102 can provide any suitable fixed line voltage or fixed line frequency to the VSD 104 depending on the configuration of the AC power grid. In addition, a particular site can have multiple AC power grids that can satisfy different line voltage and line frequency requirements. For example, a site may have 230 VAC power grid to handle certain applications and a 460 VAC power grid to handle other applications.

Figure 2:
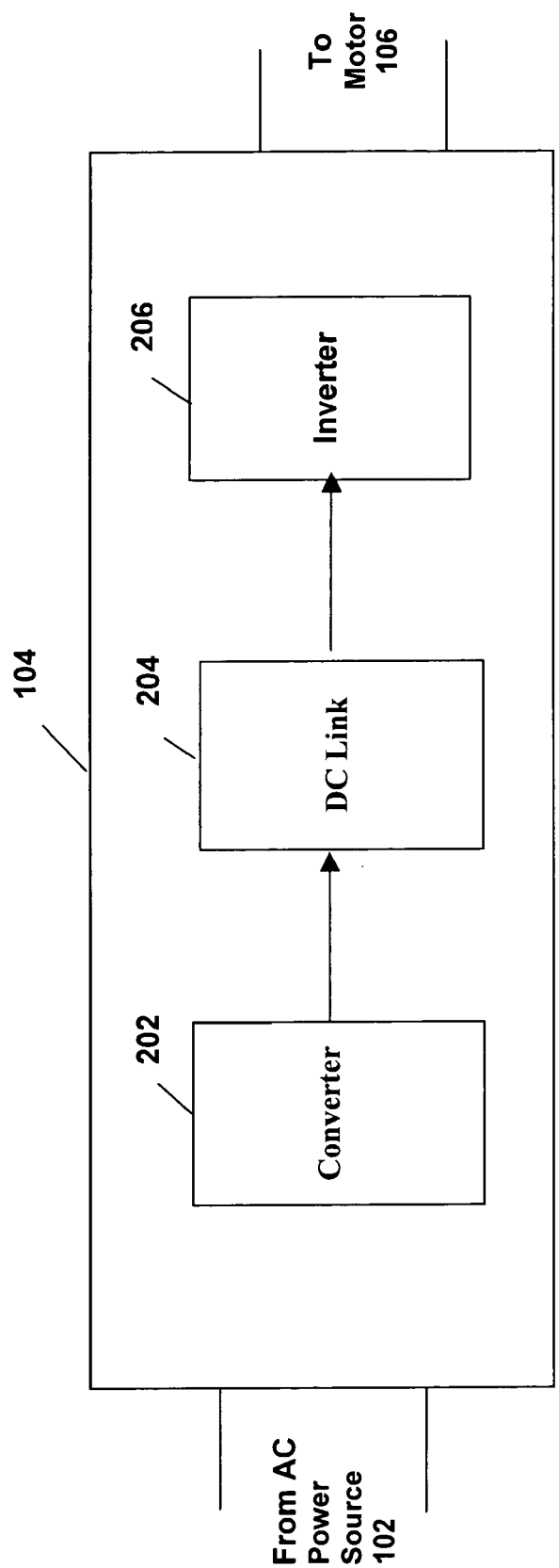
FIG. 2 illustrates schematically one embodiment of a variable speed drive used in the present invention.

The VSD 104 receives AC power having a particular fixed line voltage and fixed line frequency from the AC power source 102 and provides AC power to the motor 106 at a desired voltage and desired frequency, both of which can be varied to satisfy particular requirements. Preferably, the VSD 104 can provide AC power to the motor 106 having higher voltages and frequencies or lower voltages and frequencies than the fixed voltage and fixed frequency received from the AC power source 102. FIG. 2 illustrates schematically some of the components in one embodiment of the VSD 104. The VSD 104 can have three stages: a converter stage 202, a DC link stage 204 and an inverter stage 206. The converter 202 converts the fixed line frequency, fixed line voltage AC power from the AC power source 102 into DC power. The DC link 204 filters the DC power from the converter 202 and provides energy storage components such as capacitors and/or inductors. Finally, the inverter 206 converts the DC power from the DC link 204 into variable frequency, variable voltage AC power for the motor 106.

The particular configurations of the converter 202, DC link 204 and inverter 206 are not critical to the present invention so long as the VSD 104 can provide appropriate output voltages and frequencies to the motor 106. For example, the converter 202 can be a diode or thyristor rectifier coupled to a boost DC/DC converter to provide a boosted DC voltage to the DC link 204 in order to obtain an output voltage from the VSD 104 greater than the input voltage of the VSD 104. In another example, the converter 202 can be a pulse width modulated boost rectifier having insulated gate bipolar transistors (IGBTs) to provide a boosted DC voltage to the DC link 204 to obtain an output voltage from the VSD 104 greater than the input voltage of the VSD 104. In a preferred embodiment of the present invention, the VSD 104 can provide output voltages and frequencies that are at least twice the fixed voltage and fixed frequency provided to the VSD 104. Furthermore, it is to be understood that the VSD 104 can incorporate different components from those shown in FIG. 2 so long as the VSD 104 can provide the motor 106 with appropriate output voltages and frequencies.

The VSD 104 can prevent large inrush currents from reaching the motor 106 during the startup of the motor 106. In addition, the inverter 206 of the VSD 104 can provide the motor 106 with power having about a unity power factor. Finally, the ability of the VSD 104 to adjust both the input voltage and input frequency received by the VSD 104, permits the VSD 104 to be operated on a variety of foreign and domestic power grids without having to alter the motor 106 for different power sources.

Figure 3:
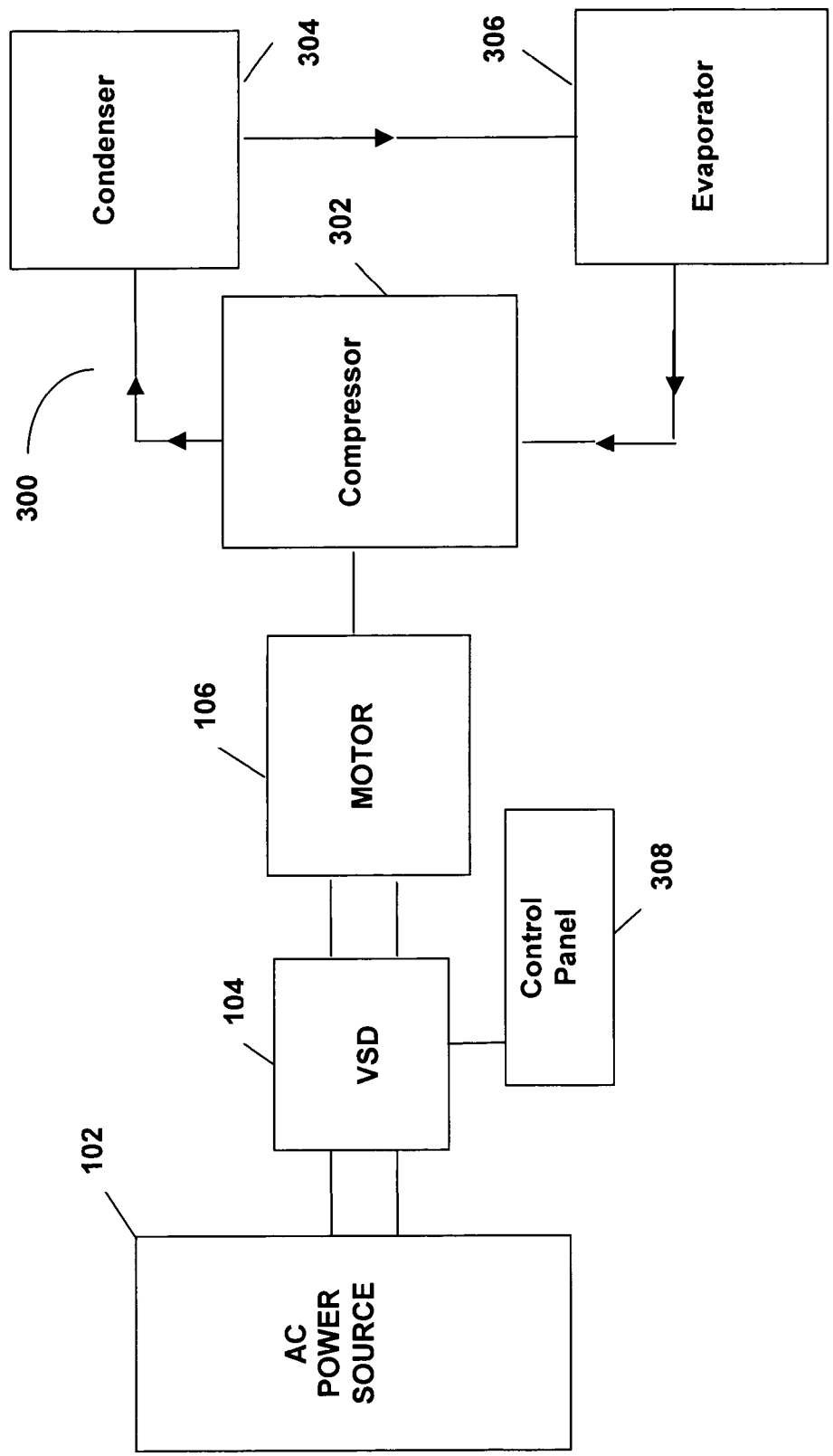
FIG. 3 illustrates schematically a refrigeration system that can be used with the present invention.

The motor 106 is preferably an induction motor that is capable of being driven at variable speeds. The induction motor can have any suitable pole arrangement including two poles, four poles or six poles. The induction motor is used to drive a load, preferably a compressor as shown in FIG. 3. In one embodiment of the present invention, the system and method of the present invention can be used to drive a compressor of a refrigeration system. FIG. 3 illustrates generally the system of the present invention connected to a refrigeration system.

As shown in FIG. 3, the HVAC, refrigeration or liquid chiller system 300 includes a compressor 302, a condenser 304, an evaporator 306, and a control panel 308. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104 and the motor 106. The conventional refrigeration system 300 includes many other features that are not shown in FIG. 3. These features have been purposely omitted to simplify the drawing for ease of illustration.

Compressor 302 compresses a refrigerant vapor and delivers the vapor to the condenser 304 through a discharge line. The compressor 302 is preferably a screw compressor, but can be any suitable type of compressor, e.g., centrifugal compressor, reciprocating compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to an evaporator 306.

The liquid refrigerant in the evaporator 306 enters into a heat exchange relationship with a second fluid, e.g., air or water, to lower the temperature of the second fluid. The refrigerant liquid in the evaporator 306 undergoes a phase change to a refrigerant vapor as a result of the heat exchange relationship with the second fluid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The present invention obtains increased horsepower and efficiency from a motor 106 by operating the motor 106 at a voltage and frequency greater than the motor's rated voltage and frequency in a constant flux or constant volts/Hz mode when the motor's load profile is a substantially constant torque load (such as a screw compressor). Alternately, the flux or volts/Hz may be reduced in situations where the motor's load profile is a variable torque load, such as a centrifugal compressor or fan. As discussed above, the constant flux or constant volts/Hz mode of motor operation, which is used for a load with a substantially constant torque profile, requires any increases or decreases in frequency provided to the motor 106 to be matched by corresponding increases and decreases in the voltages provided to the motor 106. For example, a four pole induction motor can deliver twice its rated output horsepower and speed when operated at twice its rated voltage and twice its rated frequency. When in the constant flux or constant volts/Hz mode, any increase in the voltage to the motor 106 results in an equivalent increase in the output horsepower of the motor 106. Similarly, any increase in the frequency to the motor 106 results in an equivalent increase in the output speed of the motor 106. In the case of a variable torque load, at speeds below the maximum speed, the volts/Hz ratio may be reduced to provide a slight improvement in motor efficiency, as rated motor flux is not required if rated torque is not required. Low voltage motors, i.e., those rated below 600 VAC, include stator insulation systems that are rated for full 600 VAC operation, thus the motor voltage limitation is typically 600 VAC for motors rated less than or equal to the 600 VAC level. In one embodiment of the present invention, the input voltage to the motor 106 can be increased until the input voltage is equal to the rated voltage of the insulation of the motor windings. As seen in the above example, doubling of the input voltage and frequency to the motor 106 results in a doubling of the output horsepower and speed provided by the motor 106.

In addition, for constant torque loads, e.g., a screw compressor, operation of the motor 106 in the constant flux or constant volts/Hz mode can provide more efficient motor operation than if the motor had been operated at its rated volts/frequency. When driving constant torque loads, the current drawn by the motor 106 remains relatively constant as the input voltage and frequency to the motor 106 are increased. Since the motor current remains relatively constant, the losses in the motor 106 remain relatively constant. Thus, the output horsepower of the motor 106 is increased while the motor current drawn by the motor 106 and the corresponding losses in the motor 106 have remained substantially the same, which provides for increased efficiency for the motor 106 than if the motor 106 were driven by the line voltage and frequency.

One embodiment of the present invention for obtaining increased horsepower and efficiency in the motor 106 involves connecting the motor 106 to a VSD 104 that is capable of providing the motor 106 with an input voltage and input frequency that is greater than the motor's rated voltage and frequency. In one example, the motor 106 can be rated for the corresponding line voltage and line frequency and the VSD 104 can provide an output voltage and output frequency to the motor 106 that is greater than the line voltage and line frequency. Alternatively, the motor 106 can be rated for the corresponding line frequency, and less than the corresponding line voltage and the VSD 104 can provide an output voltage substantially equal to the line voltage and an output frequency greater than line frequency. In either arrangement, the motor 106 is receiving an input voltage and input frequency that is greater than the motor's rated voltage and frequency.

Another embodiment of the present invention for obtaining increased horsepower and efficiency in the motor 106 involves connecting a dual voltage motor, i.e., a motor having both a high voltage connection and a low voltage connection, to a VSD 104. The VSD 104 is connected to the low voltage connection of the dual voltage motor and provides the low voltage connection of the dual voltage motor with an input voltage corresponding to the high voltage connection and an input frequency greater than the line frequency. The input voltage provided to the low voltage connection of the dual voltage motor by the VSD 104 can either be increased from the line voltage by the VSD 104 or be substantially equal to the line voltage depending on the particular arrangement of the dual voltage motor. In either of the above two embodiments, the motor 106 is operated at an input voltage and input frequency from the VSD 104 greater than the motor's rated voltage and frequency to obtain a greater output speed and output horsepower of the motor.

In addition, since the VSD 104 can provide a variable input voltage and variable input frequency to the motor 106, the motor can be operated at a variety of different levels in the constant flux or constant volts/Hz mode depending on the particular load of the motor. Preferably, a control panel, microprocessor or controller can provide control signals to the VSD 104 to control the operation of the VSD 104 (and possibly motor 106) to provide the optimal operational setting for the VSD 104 and motor 106 depending on the particular sensor readings received by the control panel. For example, in the refrigeration system 300 of FIG. 3, the control panel 308 can adjust the output voltage and frequency of the VSD 104 to correspond to changing conditions in the refrigeration system, i.e., the control panel 308 can increase or decrease the output voltage and frequency of the VSD 104 in response to increasing or decreasing load conditions on the compressor 302 in order to obtain a desired operating speed of the motor 106 and a desired load output of the compressor 302.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of increasing the output horsepower of an induction motor, the method comprising the steps of:
   providing an induction motor having a predetermined rated operational voltage and frequency, wherein the predetermined rated operational voltage and frequency of the motor provides a predetermined output horsepower;
   providing a variable speed drive capable of outputting a voltage and frequency greater than the predetermined rated operational voltage and frequency of the motor;
   connecting the variable speed drive to the induction motor to provide power to the induction motor; and
   operating the variable speed drive to provide an output voltage and frequency to the induction motor greater than the predetermined rated operational voltage and frequency of the induction motor, wherein powering the induction motor at an output voltage and frequency greater than the predetermined rated operational voltage and frequency results in the motor generating an output horsepower greater than the predetermined output horsepower.

2. The method of claim 1 further comprising the step of operating the induction motor in a constant flux mode of operation.

3. The method of claim 1 further comprising the step of boosting the output voltage of the variable speed drive to be at least twice an input voltage to the variable speed drive.

4. The method of claim 3 wherein the predetermined rated operational voltage of the induction motor is substantially equal to the input voltage to the variable speed drive.

5. The method of claim 1 wherein the step of providing an induction motor includes providing a dual voltage motor having a high voltage connection and a low voltage connection.

6. The method of claim 5 wherein the step of connecting the variable speed drive to the induction motor includes connecting the variable speed drive to the low voltage connection of the dual voltage motor.

7. The method of claim 1 wherein the predetermined rated operational voltage of the induction motor is less than an input voltage to the variable speed drive.

8. A system for increasing the output horsepower of a motor, the system comprising:
   a motor having a predetermined rated operational voltage and frequency, and the motor being configured to generate a predetermined output horsepower in response to the predetermined rated operational voltage and frequency of the motor being input to the motor;
   a variable speed drive connected to the motor to power the motor, the variable speed drive being configured to provide a variable output voltage and variable output frequency to the motor, the variable output voltage and variable output frequency ranging between an output voltage and output frequency less than the predetermined rated operational voltage and frequency and an output voltage and output frequency greater than the predetermined rated operational voltage and frequency; and
   wherein operation of the motor at an output voltage and output frequency greater than the predetermined rated operational voltage and frequency results in the motor generating an output horsepower greater than the predetermined output horsepower.

9. The system of claim 8 wherein the variable speed drive is configured to provide an output voltage to the motor greater than an input voltage to the variable speed drive.

10. The system of claim 9 wherein the variable speed drive is configured to provide an output voltage to the motor that is at least twice the input voltage to the variable speed drive.

11. The system of claim 10 wherein the predetermined rated operational voltage of the motor is substantially equal to the input voltage to the variable speed drive.

12. The system of claim 8 wherein the predetermined rated operational voltage of the motor is less than an input voltage to the variable speed drive.

13. The system of claim 8 wherein the motor comprises a dual voltage motor having a high voltage connection and a low voltage connection.

14. The system of claim 13 wherein the variable speed drive is connected to the low voltage connection of the dual voltage motor and can provide an output voltage substantially equal to a voltage corresponding to the high voltage connection.

15. The system of claim 8 wherein the variable speed drive comprises:
   a converter to convert AC power having a fixed voltage and fixed frequency to DC power;
   a DC link to filter and store the DC power from the converter; and
   an inverter to convert DC power from the DC link to AC power having a variable voltage and variable frequency, the variable voltage and variable frequency from the inverter being the variable output voltage and variable output frequency of the variable speed drive.

16. The system of claim 15 wherein the converter is configured to provide a voltage to the DC link greater than an input voltage to the variable speed drive.

17. The system of claim 8 wherein the motor is an induction motor.

18. A refrigeration system comprising:
- a compressor, a condenser and an evaporator connected in a closed refrigerant circuit;
- a motor connected to the compressor to drive the compressor, the motor having a predetermined rated operational voltage and frequency, and the motor being configured to generate a predetermined output horsepower in response to the predetermined rated operational voltage and frequency of the motor being provided to the motor;
- a variable speed drive connected to the motor to power the motor, the variable speed drive being configured to provide a variable output voltage and variable output frequency to the motor, the variable output voltage and variable output frequency ranging between an output voltage and output frequency less than the predetermined rated operational voltage and frequency and an output voltage and output frequency greater than the predetermined rated operational voltage and frequency; and wherein operation of the motor at an output voltage and output frequency greater than the predetermined rated operational voltage and frequency results in the motor generating an output horsepower greater than the predetermined output horsepower.

19. The refrigeration system of claim 18 wherein the variable speed drive is configured to provide an output voltage to the motor greater than an input voltage to the variable speed drive.

20. The refrigeration system of claim 19 wherein the variable speed drive is configured to provide an output voltage to the motor that is at least twice the input voltage to the variable speed drive.

21. The refrigeration system of claim 20 wherein the predetermined rated operational voltage of the motor is substantially equal to the input voltage to the variable speed drive.

22. The refrigeration system of claim 18 wherein the predetermined rated operational voltage of the motor is less than an input voltage to the variable speed drive.

23. The refrigeration system of claim 18 wherein the motor has a stator insulation system rated for 600 VAC.

* * * * *